United States Patent
Gaskins et al.

[19]

[11] Patent Number: 5,809,562
[45] Date of Patent: Sep. 15, 1998

[54] CACHE ARRAY SELECT LOGIC ALLOWING CACHE ARRAY SIZE TO DIFFER FROM PHYSICAL PAGE SIZE

[75] Inventors: Darius Gaskins; Glenn Henry, both of Austin, Tex.

[73] Assignee: Integrated Device Technology, Inc., Santa Clara, Calif.

[21] Appl. No.: 655,306

[22] Filed: May 20, 1996

[51] Int. Cl.$^6$ .................................................. G06F 12/02
[52] U.S. Cl. ........................... 711/207; 711/3; 711/202; 711/206; 711/118; 711/119; 711/125
[58] Field of Search ................................. 395/403, 445, 395/455, 456, 412, 416, 417, 452, 453; 711/3, 202, 206, 207, 118–119, 128–129, 125, 126

[56] References Cited

U.S. PATENT DOCUMENTS

| | | | |
|---|---|---|---|
| 4,493,026 | 1/1985 | Olnowich | 395/455 |
| 4,926,385 | 5/1990 | Fujishima et al. | 355/230.03 |
| 5,003,459 | 3/1991 | Ramanujan et al. | 345/403 |
| 5,034,636 | 7/1991 | Reis et al. | 327/52 |
| 5,226,133 | 7/1993 | Taylor et al. | 395/417 |
| 5,367,653 | 11/1994 | Coyle et al. | 395/455 |
| 5,410,669 | 4/1995 | Biggs et al. | 395/445 |
| 5,479,627 | 12/1995 | Khalidi et al. | 395/415 |

*Primary Examiner*—Eddie P. Chan
*Assistant Examiner*—Than V. Nguyen
*Attorney, Agent, or Firm*—James W. Huffman

[57] ABSTRACT

An apparatus and method for organizing a data array within a cache system to store a plurality of physical pages of data. A single data array is associated with a plurality of tag arrays, each tag array tracking a page size portion of the data array. Indexing into each of the tag arrays is accomplished using the page index from either of the virtual address or the physical address. In addition, selection of indexed tags from the tag arrays is performed by array selection logic which utilizes portions of either of the virtual page number or the physical page number.

39 Claims, 9 Drawing Sheets

CACHE ARRAY SELECT LOGIC ALLOWING CACHE ARRAY SIZE TO DIFFER FROM PHYSICAL PAGE SIZE

BACKGROUND

1. Field of the Invention

This invention relates in general to the field of cache memory in computer systems, and more particularly to an improved method and apparatus for indexing into a tag array using both physical and virtual addresses.

2. Description of the Related Art

Modern computer systems employ a number of different memory devices and memory architectures to store instructions which will be executed, or data which will be processed. The types of devices used, and the manner in which they are connected, vary from system to system, depending on a designer's criteria.

In most computer systems, an important tradeoff that is made is that of speed versus cost. Faster execution speed is more costly. This is especially true when designing memory systems. A brief review of memory devices will help illustrate this point.

A simple computer includes a processing system which reads instructions from a memory system, reads data required by the instructions from the memory system, executes the instructions, and stores the results of the operations back to the memory system. If the processing system is required to wait on the memory system, either in reading instructions or data, or in writing data, the performance of the system is negatively effected. A typical goal of a computer system designer is to provide a memory system that creates minimum delays for the processing system, at the lowest possible cost.

Memory systems often include a combination of different types of memory devices, each provided for a particular purpose. For example, a hard disk drive is a memory device that provides a large area for permanent storage of instructions and data at a relatively nominal cost. It is not uncommon to find hard disk drives which store between 1.6 and 2 gigabytes of information for less than $300. However, by processor standards, hard drives are very slow. Other examples of mass storage devices include floppy drives, optical disks, and digital tapes.

A second type of memory device is a dynamic random-access-memory, or DRAM. A DRAM provides temporary storage for instructions and data, and is several orders of magnitude faster than a hard disk drive. However, DRAM is also more expensive. The same $300 invested in DRAM will provide only 16 to 24 megabytes of storage.

A third type of memory device is a static random-access-memory, or SRAM. An SRAM provides temporary storage for instructions and data, and is significantly faster than DRAM. However, it is even more expensive. The same $300 invested in SRAM will only provide between 256 and 512 kilobytes of storage.

Early memory systems provided a hard disk drive as the primary storage location for instructions and data, and placed DRAM between the hard disk drive and the processing system for temporary storage of data. During program execution, the processing system would attempt to read an instruction or data from the DRAM. If the requested instruction/data was present in the DRAM, it would be provided to the processing system with only nominal delay. However, if the instruction were not present in the DRAM, a request would be made to the hard disk drive to transfer the instruction/data to the DRAM. The hard drive would transfer a block of information, e.g., about 2000 bytes, to the DRAM, a byte a time. The DRAM could then provide the requested instruction/data to the processing system for execution. In addition, the DRAM could often provide subsequent instructions/data from the DRAM, at least until a request came from the processing system for instructions/data outside of the 2 k block that had been transferred from the hard drive. However, until the first requested instruction was received by the processing system, the processing system was required to wait, or halt processing.

A number of improvements have been made to try to minimize transfer requests between DRAM and the hard disk, or to try to insure that instructions/data requested by the processing system are present in the DRAM at the time of the request. One improvement is simply to increase the amount of DRAM in the computer system. The more DRAM in a computer system, the more likely the instructions/data requested by the processing system will be present. A second improvement has been to include memory management systems which attempt to determine which instructions/data in the DRAM will most likely be needed in subsequent operations, and try to keep this information from being overwritten, or anticipate which data that is not presently in DRAM will be needed in the future, and access the hard drive prior to the information/data being requested by the processing system.

As execution speed of processing systems have increased, so has the speed of DRAM and hard disk drives. However, the speed of processing systems have outpaced that of DRAM to the point where reading from or writing to DRAM requires the processing system to wait. To overcome this wait, high speed SRAM is placed between the DRAM and the processing system to temporarily store instructions/data. The high speed SRAM that is placed between the DRAM and the processing system is called a cache. The purpose of the cache is to provide temporary storage for a subset of the instructions/data which are stored in DRAM, yet provide the subset of instructions/data to the processing system faster than the DRAM.

For example: A processing system requests an instruction/data from the memory system. If the instruction/data is present in SRAM, the instruction/data is provided to the processing system with zero wait states, i.e., the SRAM does not cause the processing system to wait for the instruction/data. If the SRAM does not contain a copy of the requested instruction/data, the processing system must go to the DRAM. If the instruction/data is available in DRAM, the data is provided to the SRAM, along with other instructions/data which will likely be needed in subsequent operations. The SRAM then provides the requested instruction/data to the processing system. In some instances, the requested data is provided directly to the processing system in parallel with providing it to the SRAM.

Once the data is in the SRAM, the data must be "tagged" so that the data can be retrieved, and so that changes to data in the DRAM can either be reflected in the SRAM, or the copy of the data in SRAM can be invalidated. To track which data has been stored in SRAM, tags are provided which are associated with, or correspond to each addressable SRAM location. The purpose of a tag is to store the DRAM address of the data which is stored in the associated SRAM location. Then, when a processing system requests data, the address of the requested data is compared to the contents of the tags, and if a match is found, data in the associated SRAM location is provided to the processing system.

In early small cache systems (fully associative), tags often contained enough bits to store the full physical address of the DRAM location which was copied to the associated SRAM location. However, this arrangement required that each tag be compared to a generated address to determine whether a "hit" in the SRAM occurred. This was too time consuming, and was impractical for larger caches.

Caches of lesser associativity than fully associative caches, termed "set-associative caches", were introduced to correct this problem and to allow larger caches to be used. Set-associative caches view cache memory the same way the processing system views pages in main memory. Addressable memory is divided into a number of pages, where each page has a number of sets of data contained therein. To address a particular memory location, the page (the physical page number) is determined from the upper bits of the address, and the set (the offset or index) is determined from the lower bits of the address. A more complete discussion of paging is provided below in the detailed description.

By organizing the cache memory to contain the same amount of data as a page in DRAM, each set in the cache had a one to one correspondence with a set on a page in DRAM. The lower address bits of an address could then be used to select a particular set, or tag. The tag could contain the upper address bits which corresponded to the page in DRAM of the data copied into the associated SRAM location. Thus, when an address was generated by a processing system, the lower address bits referenced a particular tag (or set), and the upper address bits were compared to the contents of the referenced tag. Thus, in a set associative cache, determining whether a cache memory contained the desired data only required comparison of the upper bits of the address to a single tag within each set. A four-way set-associative cache, for example, would only require four comparisons, often performed in parallel.

While set-associative cache systems provided an easy mechanism for tracking the DRAM address locations of data copied into the cache memory, it constrained the organization of cache memory, and the tags associated therewith, to conform to the page size of physical memory. Thus, if 4 kilobytes is the standard page size for physical memory, set-associative cache memories must also be organized on 4 kb boundaries. To have a cache bigger than 4 kb, each cache/tag array pair was duplicated. An 8 kb cache had two cache arrays and two corresponding tag arrays. A 16 kb cache had four cache arrays, and four corresponding tag arrays. As one skilled in the art will appreciate, if the cache/tag array pair do not correspond to physical pages in memory, then the lower address bits used to index into each tag array may not be the same for both the physical address and the virtual address. And, if the index bits for the physical address and virtual address are not the same, "snooping" into the cache is difficult, if not impossible.

Duplication of cache arrays requires duplication of a significant portion of hardware associated with storing and retrieving data in each array. Such hardware includes: decode logic which determines which row in an array should be asserted; bit line drivers which drive column bit lines within each array; and sense amps. Duplication of this hardware requires a considerable portion of silicon space allocated for the cache, and requires a significant number of transistors, both of which add to the cost and complexity of the cache system.

What is needed is an apparatus and method which allows a data array within a cache to be organized according to space and cost considerations, yet which still allows quick indexing by both physical and virtual addresses.

SUMMARY

For the foregoing reasons, there is a need for an apparatus and method which allows a data array within a cache memory to be multiple pages in size, while still allowing tags to be accessed by both physical addresses and virtual addresses.

To address the above-detailed deficiencies, it is an object of the present invention to provide an apparatus and method which maps a plurality of tag arrays to a single data array within a cache memory.

It is another object of the present invention to provide a tag array structure which can be addressed by both physical addresses and virtual addresses.

Accordingly, in the attainment of the aforementioned object, it is a feature of the present invention to provide a cache memory within a processing system that allows a data array to store more data than is stored in a physical page in a main memory. The cache memory system includes: a data array, the data array having a plurality of cache lines for storing data; and a plurality of tag arrays, each of the tag arrays having a plurality of tag lines, each of the plurality of tag lines associated with one of the plurality of cache lines. Each of the tag lines includes: a tag, for storing a physical page number corresponding to the data which is stored in the associated cache line; and array select logic, connected to the plurality of tag arrays, for selecting which of the plurality of tag arrays contains a desired tag, whether the cache memory system is addressed with a physical address or a virtual address.

Another feature of the present invention is to provide the cache memory system as described above wherein the cache memory stores a subset of data that is also stored in the main memory.

Yet another feature of the present invention is to provide the cache memory system as described above wherein each of the plurality of cache lines has a corresponding one of the plurality of tag lines.

A further feature of the present invention is to provide the cache memory system as described above wherein each of the plurality of cache lines further includes a plurality of sub cache line locations for storing the data.

Another feature of the present invention is to provide the cache memory system as described above wherein each of the sub cache line locations stores a quantity of the data equal to the width of a data bus in the processing system.

Yet another feature of the present invention is to provide the cache memory system as described above wherein the plurality of cache lines has a cache line for each of the plurality of tag lines in each of the plurality of tag arrays.

An additional feature of the present invention is to provide the cache memory system as described above wherein each of the plurality of tag arrays contains a number of the plurality of tag lines corresponding to an integer divisible number of the plurality of cache lines.

A further feature of the present invention is to provide the cache memory system as described above wherein each of the plurality of tag arrays contains the tag lines associated with a physical page worth of the data stored in the plurality of cache lines.

Yet another feature of the present invention is to provide the cache memory system as described above wherein the virtual address is translated into the physical address, and wherein the physical address further includes: a physical page number defined by certain high order bits in the physical address; and a first index, defined by certain low order bits in the physical address; wherein the physical page number provides a base address for a physical page in the main memory, and the first index provides an offset from the base address within said physical page; and wherein the virtual address further includes: a virtual page number defined by certain high order bits in the virtual address; and a second index, defined by certain low order bits in the virtual address; wherein the virtual page number provides a base address for a virtual page, to be translated into a corresponding physical page in the main memory, and the first index and the second index are the same for each virtual address translated into a physical address.

Another feature of the present invention is to provide the cache memory system as described above wherein the virtual page number is translated into the physical page number by a paging unit.

Another feature of the present invention is to provide the cache memory system as described above wherein both the first index and the second index may be used to address one of the plurality of tag lines within at least one of the plurality of tag arrays.

Yet another feature of the present invention is to provide the cache memory system as described above wherein the first index or the second index may be used to address one of the plurality of tag lines within more than one of the plurality of tag arrays.

A further feature of the present invention is to provide the cache memory system as described above wherein certain low order bits of the virtual page number may be used to select a particular one of the plurality of tag arrays.

Another feature of the present invention is to provide the cache memory system as discussed above where each of the plurality of tag arrays are addressed by the physical address.

Yet another feature of the present invention is to provide the cache memory system as described above wherein for the virtual address, the second index is used to address one of the plurality of tag lines within at least one of the plurality of tag arrays, and the certain low order bits of the virtual page number is used to select the particular one of the plurality of tag arrays.

An additional feature of the present invention is to provide the cache memory system as described above wherein for the physical address, the first index is used to address one of the plurality of tag lines within at least one of the plurality of tag arrays.

A further feature of the present invention is to provide the cache memory system as described above wherein the cache memory system further comprises cache snoop logic, for snooping the physical address on an address bus, and for using the snooped physical address to determine whether data stored at the physical address in the main memory is also stored in the data array.

In another aspect of the present invention it is a feature to provide an addressing system for a cache memory, the addressing system allowing a tag array to be addressed by either a physical address on a physical address bus or a virtual address on a virtual address bus, the addressing system includes: a data array, the data array having a plurality of cache lines for storing data; a plurality of tag arrays connected to the data array, each of the tag arrays having a plurality of tag lines, the tag lines corresponding to the plurality of cache lines, each of the tag arrays addressing the equivalent of a physical page of stored data; an index address portion, within each of the virtual address and the physical address, which has the same value for both the virtual address and the physical address, the index address portion being used to select a particular one of the plurality of tag lines within each of the plurality of tag arrays; an overlapped address portion, within both of the virtual address and the physical address, which may not have the same value for both of the virtual address and the physical address; and array select logic, connected to the plurality of tag arrays, and to both of the virtual address bus and the physical address bus, for reading the overlapped address portion, from either of the virtual address bus or the physical address bus, and for selecting a particular tag array from the plurality of tag arrays; whereby the index address portion indexes a desired tag line within each of the plurality of tag arrays, and wherein the array select logic uses the overlapped address portion to select a particular one of the desired tag lines from one of the plurality of tag arrays.

An additional feature of the present invention is to provide the addressing system for a cache memory, as described above, wherein the cache lines further include a plurality of storage bits, each for storing a single bit of digital data.

Another feature of the present invention is to provide the addressing system for a cache memory, as described above, wherein the data array further includes row select logic for selecting particular ones of the plurality of cache lines, and column bit line drivers, for selecting ones of the plurality of storage bits.

Yet another feature of the present invention is to provide the addressing system for a cache memory, as described above, wherein the row select logic and the column bit line drivers can address all of the plurality of storage bits within the data array.

Another aspect of the present invention provides a method for accessing a data array within a cache memory which allows the data array to be larger than a physical page in a main memory, the data array including a plurality of cache lines, and the cache memory including a plurality of tag arrays, each of the tag arrays having tag lines corresponding to the cache lines, the method including the steps of: providing a physical page in a main memory of size N; providing a data array in a cache memory of size M*N, where M is an integer having a value greater than 1; providing M tag arrays having a plurality of tag lines, each of the tag arrays corresponding to a sub portion of size N of the data array; using index bits within both a physical address and a virtual address to address one of the plurality of tag lines within each of the tag arrays; using overlap bits within both the physical address and the virtual address to address one of the M tag arrays; whereby the combination of the index bits and the overlap bits specifies a particular location within the data array.

An advantage of the present invention is that by allowing a data array within a cache memory to store several physical pages of data, hardware typically associated with physical page data arrays, such as row lines, column bit line drivers, sense amps, etc., need not be duplicated for each physical page, but may be combined in one larger data array.

A further advantage of the present invention is that by combining hardware typically associated with the physical page data arrays, less surface area is required for the physical data array of the cache memory. This has the additional advantage of providing a cache memory which is less costly to manufacture.

Additional objects, features and advantages of the invention will be described hereinafter. Those skilled in the art should appreciate that they can readily use the disclosed conception and specific embodiment as a basis for designing or modifying other structures for carrying out the same purposes of the present invention.

DESCRIPTION OF THE DRAWINGS

The present invention will become better understood with regard to the following description, and accompanying drawings where.

DETAILED DESCRIPTION

As mentioned above, as processor speeds increased, the speed of DRAM increased at a slower pace. Thus, to gain the maximum performance benefit of faster processors, faster random-access-memory (RAM) is used. However, because of the expense of faster RAM, a combination of slow DRAM, and fast SRAM is often chosen. The use of SRAM within a memory system is referred to as cache.

Figure 1:
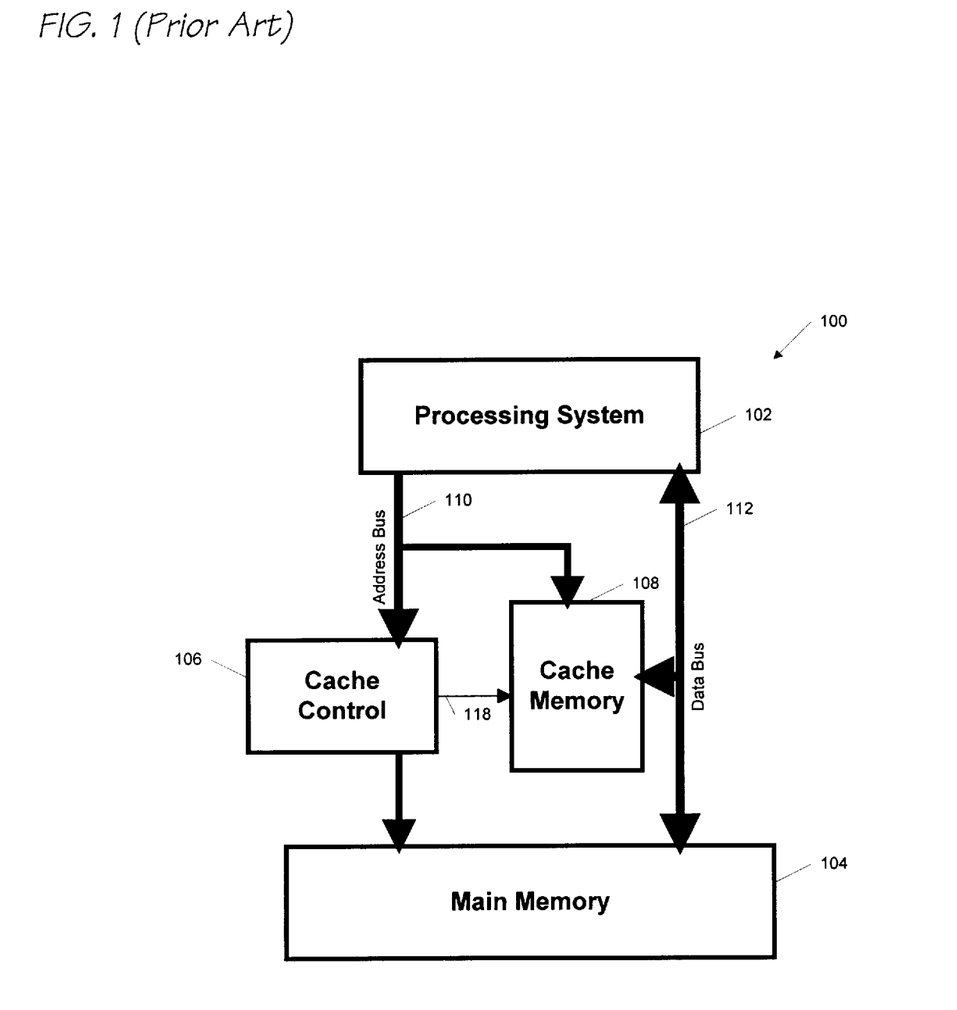
FIG. 1 is a block diagram of a prior art computer system having a cache memory system.

Referring to FIG. 1, a block diagram of a prior art computer system 100 is shown. The computer system 100 includes a processing system 102 connected to a main memory 104, via an address bus 110 and a data bus 112. Also shown is a cache control 106 connected to a cache memory 108. The cache controller 106 is connected to the address bus 110, and the cache memory 108 is connected to both the address bus 110, and the data bus 112. The cache controller 106 is connected to the cache memory 108 via an enable signal 118. The cache memory 108 is typically populated with a small amount of high speed SRAM, while the main memory 104 is populated with a larger amount of relatively slow access DRAM.

In operation, the processing system 102 reads instructions and/or data from the main memory 104, executes the instructions, or operates on the data, and stores results back into the main memory 104. More specifically, the processing system 102 provides an address for each desired instruction/data on the address bus 110. The main memory 104 uses the address provided on the address bus 110 to retrieve the desired instruction/data, and provides it to the processing system 102 via the data bus 112.

The cache control 106 attempts to maintain copies of frequently accessed information read from the main memory 104 in the cache memory 108. When the cache control 106 sees the processing system 102 initiate a memory read bus cycle, it checks to determine whether it has a copy of the requested information in the cache memory 108. If a copy is present, the cache control 106 immediately reads the information from the cache memory 108, and transfers the read information back to the processing system 102 via the data bus 112. If the cache control 106 determines that it does not have a copy of the requested information in the cache memory 108, the information is read from the main memory 104. This is known as a read "miss" and results in wait states, causing the processing system 102 to delay processing. The requested information is sent from the main memory 104 back to the processing system 102 to fulfill the request. In addition, the information is also copied into the cache memory 108 by the cache control 106. The next time the processing system 102 wishes to access the requested information, it can be provided by the cache memory 108 without any wait states. Thus, by using the cache control 106 to maintain data/instructions in the cache memory 108, wait states typically associated with accesses to the main memory 104 may be reduced.

Figure 2:
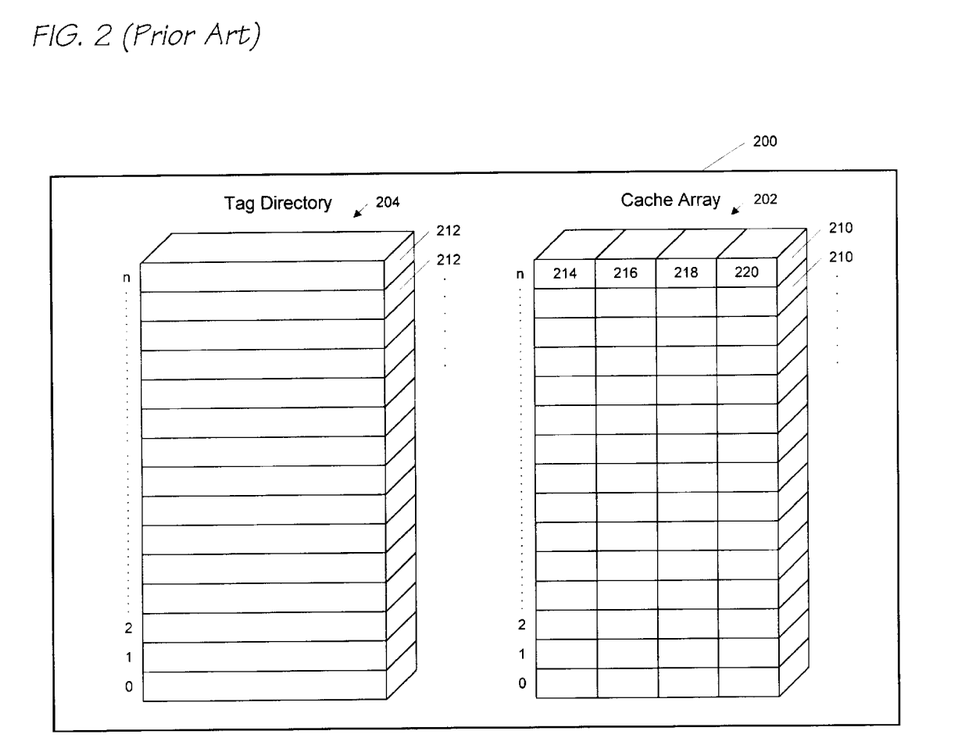
FIG. 2 is a block diagram of the cache memory of FIG. 1.

Now referring to FIG. 2, a cache memory 200 is shown. The cache memory 200 contains a cache array 202 and a tag directory 204. The cache array 202 contains a plurality of cache lines 210 labeled 0 . . . n. Each of the cache lines 210 contains a number of sub cache line locations 214, 216, 218 and 220. The tag directory 204 also contains a plurality of tag lines 212 labeled 0 . . . n.

As mentioned above, the cache memory 200 attempts to keep a copy of frequently accessed data within the cache array 202. What is implicit in this statement is that the cache array 202 cannot maintain a copy of all of the data that is in the main memory 104. To do so would be extremely expensive, and would defeat the purpose of using a cache memory. Rather, the cache memory 200 holds a subset of data which is stored in the main memory 104, and stores the subset of data in the cache array 202 in individually addressable locations called cache lines 210.

The tag directory 204 contains a listing of all the memory addresses that have copies stored in the cache array 202. Each cache line 210 has a corresponding entry in the tag directory 204 stored in an associated tag line 212. The contents of the tag directory 204 are compared to the memory address from the processing system 102 to determine if a copy of the requested information is contained within the cache array 202. The contents of the tag directory 204 are updated each time new information is stored in the cache array 202.

Several methodologies have been developed for associating the cache lines 210 with the tag lines 212, and the contents of the tag lines 212 with physical memory locations in the main memory 104. One such method is called the fully-associative cache. In a fully associative cache, any location in the main memory 104 can be copied to any location within the cache array 202. However, to keep track of any location in the main memory 104, the tag directory 204 must store the entire memory address, since any given memory location requested might be found in any one of the cache locations. But, each access to the main memory 104 requires that the address of the requested information be compared to each entry in the entire tag directory 204 to determine if the requested information is in the cache array 202. The time needed to check the address against the tag directory 204 entries (called the look-up penalty) can be unacceptably long in fully-associative caches. Since the look-up penalty can be substantial, fully-associative caches are usually quite small. And, being small, do not provide acceptable hit rates with most applications.

Another method of organizing cache memory is called the Direct Mapped Cache. Direct mapped caches (One-Way Set-Associative) require that only one directory entry be checked to determine whether the requested memory location is in cache. This means that cache hits and misses can be determined very quickly. The cache control 106 views the main memory 106 as being divided into numerous pages, each being the same size and having the same organization as the cache memory 108. Every location in the main memory 104 occupies a given set position within a page. When a memory location is read, it is placed in cache at the same set location that it occupies in the main memory 104. In other words, information from a given set in the main memory 104 is mapped into the same set within the cache. For a direct-mapped cache, each set has a single directory entry, therefore, the information stored in a set must come from one page in the main memory 104.

Direct-mapped cache structures allow the cache control 106 to identify the location of information in the cache memory 108 based on the set position that a location occupies in the cache array (e.g., the set where the memory location comes from within a page), and the page number contained in the tag directory 204 (e.g., the page number the location comes from in the main memory 104).

More specifically, FIG. 2 shows a cache array 202 which is divided into a number of sets, or cache lines 210, labeled 0 . . . n. Thus, both the main memory 106 and the cache array 202 are viewed by the cache control 106 as having n sets of data for each memory page in the main memory. The tag directory 204 stores the page address of main memory 104 for data which is stored in each set in the cache array 202. Each time the processing system 102 requests information from the main memory 104, the cache control 106 compares the address to a tag directory 204 entry. Unlike the fully-associative cache, the cache control 106 need only compare the requested memory address against a single directory entry. The lower portion of the address identifies which set the location occupies in main memory, and thus identifies the tag line 212 within the tag directory 204 that must be checked. The upper portion of the address is compared to the address stored in the identified tag line 212 to determine if the memory page requested matches the entry. If they match, the request is a cache hit, and if not, it is a cache miss.

In many popular microprocessor based systems, the address bus is 32-bits wide. This allows the microprocessor to address $2^{32}$ or 4G different memory locations. Assuming each memory location stores 8-bits, or 1-byte, of data, a 32-bit address can reference 4 gigabytes of data. In this environment, it has become standard to define a page in memory as containing 4096 bytes of data. Thus, within a 4 GB address space, there are 1,000,000 pages, where each page contains 4 Kbtyes. To index one of the 4096 bytes within a particular page requires 12-bits ($2^{12}$) of the 32-bit address. To access one of the 1,000,000 different pages in memory requires 20-bits ($2^{20}$) of the 32-bit address. So, the 32-bit address is often separated into two distinct parts, as will be further described below with reference to FIG. 4, where the lower 12-bits define the set within a memory page, and the upper 20-bits define the memory page.

Still referring to FIGS. 1 & 2, in a direct mapped cache system, where the address bus 110 is 32-bits wide, when the processing system 102 addresses a location in the main memory 104, the cache control 106 examines the lower 12 bits of the address to determine which of the tag lines 212 corresponds to the set in the main memory where the desired data is stored. Using the lower 12-bits, the appropriate tag line 212 is selected, which corresponds to the set in main memory which holds the desired data. And, the upper 20-bits, which define the page in main memory where the desired data is stored, is compared to a 20-bit tag (not shown) which is stored in the selected tag line 212. If the upper 20-bits are the same as the tag, a cache hit occurs, and the addressed data is provided from the corresponding cache line 210. If the upper 20-bits are not the same, a cache miss occurs, and the data is retrieved from the main memory 104.

One skilled in the art appreciates that the cache array 202 is often configured to have less than 4096 different sets. Rather, sub line locations 214–220 are each configured to store a quantity of data equal to the width of the data bus 112. For example, if the data bus is 64-bits wide, each sub line location 214–220 may store 8 bytes of data. In addition, a number of sub line locations 214–220 may be configured along a single cache line 210. In FIG. 2, four sub line locations 214–220 are shown, each storing 8 bytes, for a total of 32-bytes of data for each cache line. Thus, to store a page, or 4 kilobytes of data, just 128 cache lines 210 are required. There are a corresponding number, 128 tag lines 212 associated with each cache line 210.

By configuring cache memory to correspond to physical pages in main memory, at least three problems are created. The first is that cache array size is limited to 4 kilobytes in size. Thus, for larger caches, duplication of cache arrays and tag directories is required (as will be shown with reference to FIG. 3). Second, unless duplication of cache arrays is provided, each set can relate to only one page at a time. Thus, two pieces of data from the same set, but from different pages, cannot be stored in a one-way cache. But third, in duplicating cache arrays, all hardware associated with accessing an array, e.g., bit line drivers, row drivers, sense amps, etc., must also be duplicated. This will be discussed further below with referenced to FIG. 8.

Figure 3:
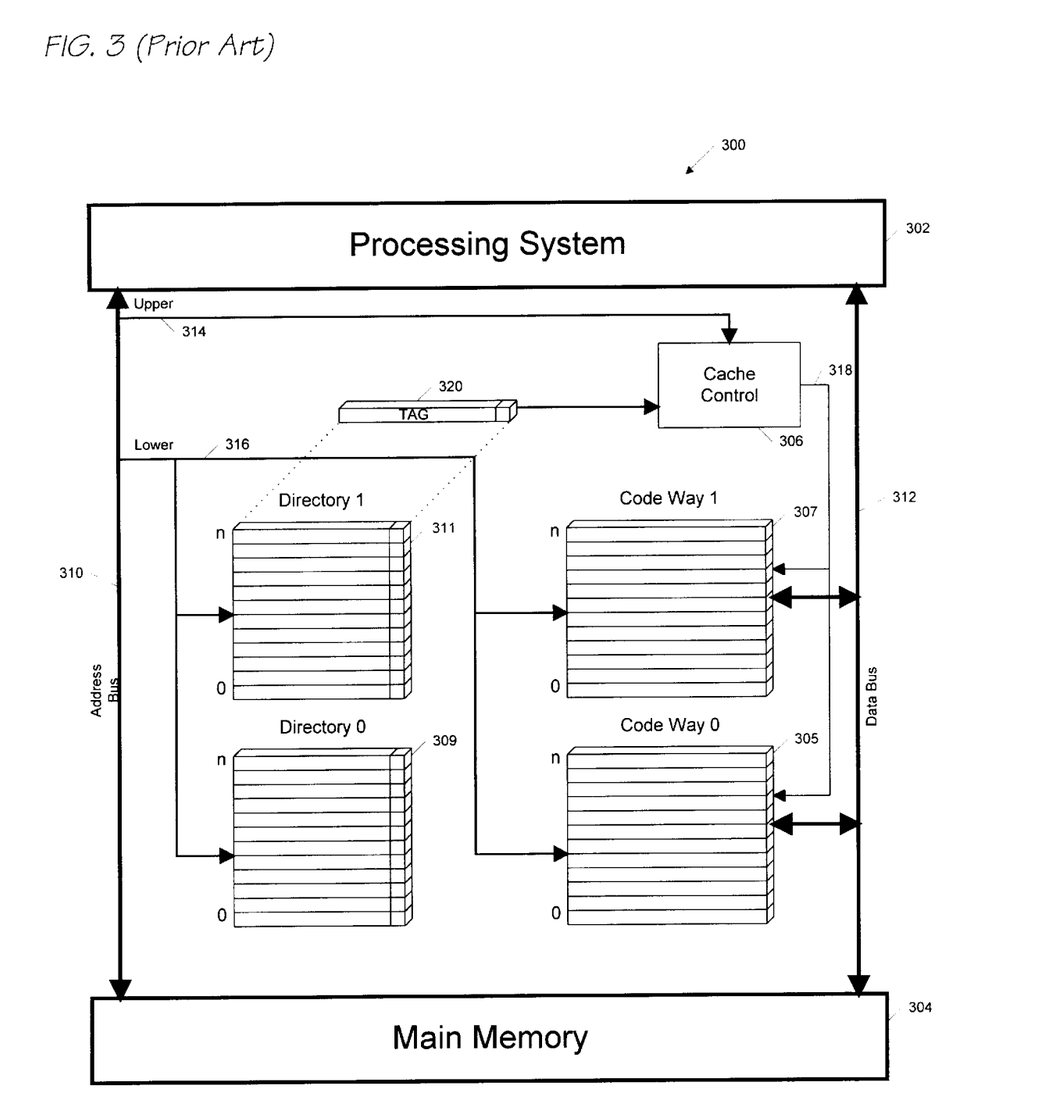
FIG. 3 is a block diagram of a prior art computer system illustrating a two-way set-associative cache memory.

Now referring to FIG. 3, a block diagram of a prior art computer system 300 is shown which illustrates a two-way set-associative cache (where each way stores 4 kilobytes of data, corresponding to a physical page in main memory). The computer system 300 includes a processing system 302 connected to a main memory 304 via an address bus 310 and a data bus 312. Between the processing system 302 and the main memory 304 is a cache memory system. The cache memory system includes: a cache control 306 connected to the upper address bits 314; a cache memory which is split into code way 0, 305, and code way 1, 307; and a cache directory which is split into a directory 0, 309, and a directory 1, 311. Expanded out from the cache directory 1, 311, is a TAG 320. In this example, a TAG 320 exists for, and is associated with, every cache line within the cache memory 305, 307. The TAG 320 stores a record of which location in main memory 304 is stored in its associated cache line in the cache memory 305, 307. The TAG 320 is used by the cache control 306 to compare requests made by the processing system 302 with the contents of the cache memory 305, 307.

In a two-way set-associative cache, when the cache control 306 gets information from the main memory 304, it has a choice of two cache memory banks to store the data in, i.e., code way 0, 305, and code way 1, 307. In other words, the controller must choose one of two ways to store the data in. Each of the code ways has its own directory 309, 311. Since there are two ways for information to be cached in, each memory request is now compared to two directory entries to determine whether or not the information is currently stored in the cache. For a more complete description of cache memory systems, please see *ISA SYSTEM ARCHITECTURE*, 3$^{rd}$ ed., Tom Shanley, Don Anderson.

As in the direct-mapped one-way set-associative cache, the lower bits of the address are used to index into the set 0 . . . n where data is stored, and the upper address bits are compared to the page which is stored in the indexed tag line. In FIG. 3, the lower address bits 316, say 0 . . . 11 index into one of 128 different cache lines, assuming each cache line stores 32-bytes of data, as in the example discussed with reference to FIG. 2. The upper address bits 314, say 12 . . .

31, are compared to the 20-bit value stored in the TAG 320 to determine whether the requested data is stored in the cache. In this example, the cache control 306 indexes the appropriate set from directories 309, 311 in parallel, and compares the indexed tags to the upper 20-bits on the address bus, to determine whether a hit occurs. If one of the TAGs equals the desired address, the appropriate cache line in one of the two code ways 305, 307 is selected to provide the data.

Figure 4:
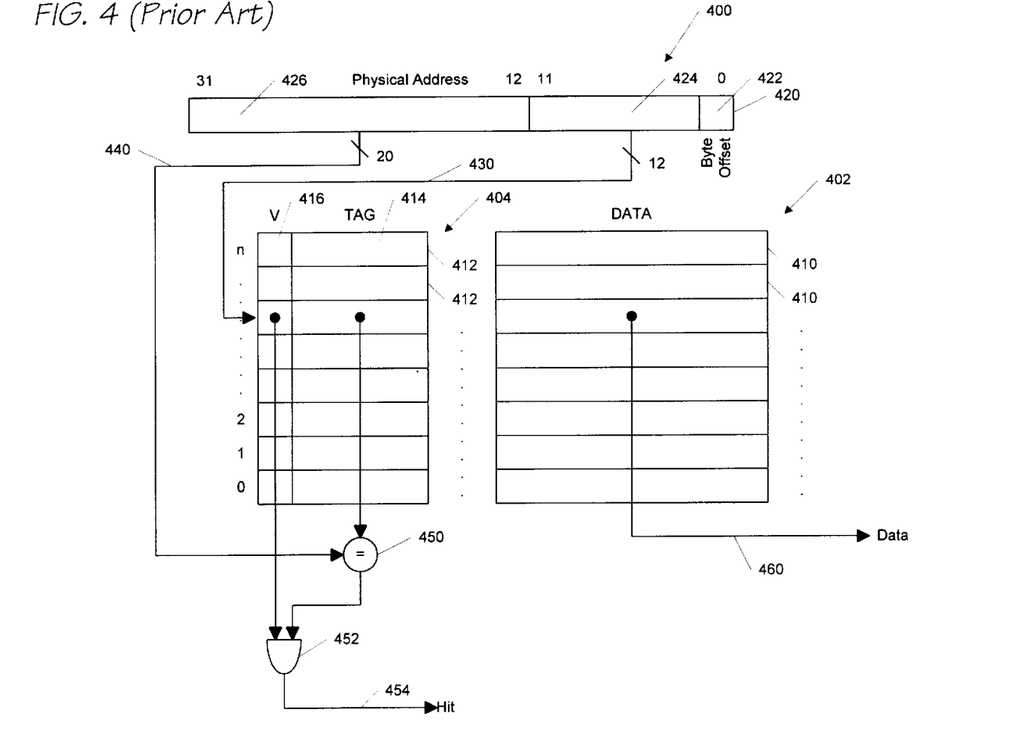
FIG. 4 is a block diagram of a prior art cache memory illustrating access to the cache memory using a physical address.

Referring now to FIG. 4, a block diagram of a cache memory 400 is shown which illustrates access to cache memory using a physical address. One skilled in the art understands that a physical address is that address that refers specifically to physical pages in memory, rather than a virtual address which must first be translated into a physical address. In FIG. 4, a data array 402 is shown beside a tag directory 404. The data array has a plurality of cache lines 410 for storing data. Associated with each cache line 410 is a tag line 412 within the tag directory 404. Each of the tag lines 412 contain two portions. The first portion is the TAG 414 which contains the physical page number (ppn) for data which is stored in the associated cache line 410. The second portion is the valid bit 416 which is used to indicate whether the data which is stored in the associated cache line 410 is valid, i.e., contains the same value as is stored at the referenced address in main memory.

Above the data array 402 is shown a 32-bit physical address 420. The physical address 420 may be transmitted to the cache memory 400 via an address bus such as that shown in FIG. 3. The physical address 420 contains two portions. The first portion is a 20-bit physical page number (ppn) 426 which is used to specify the physical page base in main memory which contains the desired data. The second portion is the offset or index 424. The offset 424 is typically the lower 12-bits (0 . . . 11) of the physical address 420. The offset 424 is used to specify the particular set within the specified page of the desired data. Within the offset 424 is a byte offset 422 which often determines which byte within a 32-bit word is referenced.

The offset 424 is shown connected, via a bus line 430 to the tag array 404. As discussed above, the offset 424 refers to a set within a page in memory. Thus, the offset 424 is used to index a particular tag line 412 within the tag array 404. The valid bit 416 of the indexed tag line 412 is provided as an input to an and gate 452. The tag 414 of the indexed tag line 412 is provided as an input to a comparator 450. The physical page number, 426 is also provided as in input to the comparator 450.

The operation of the cache memory 400 is as follows. As a physical address 420 is provided to the cache memory 400, the offset 424 indexes a tag line 412 via a bus 430. The tag 414 from the indexed tag line 412 is provided to the comparator 450 along with the ppn 426. If the ppn 426 is the same as the tag 414, then the comparator provides an output to the and gate 452 to indicate that the associated cache line 410 in the data array contains the desired data. If the valid bit 416 of the indexed tag line indicates the data is valid, then the and gate 452 provides a hit output on signal line 454. The hit signal releases the data in the cache line 410 associated with the indexed tag line.

Figure 5:
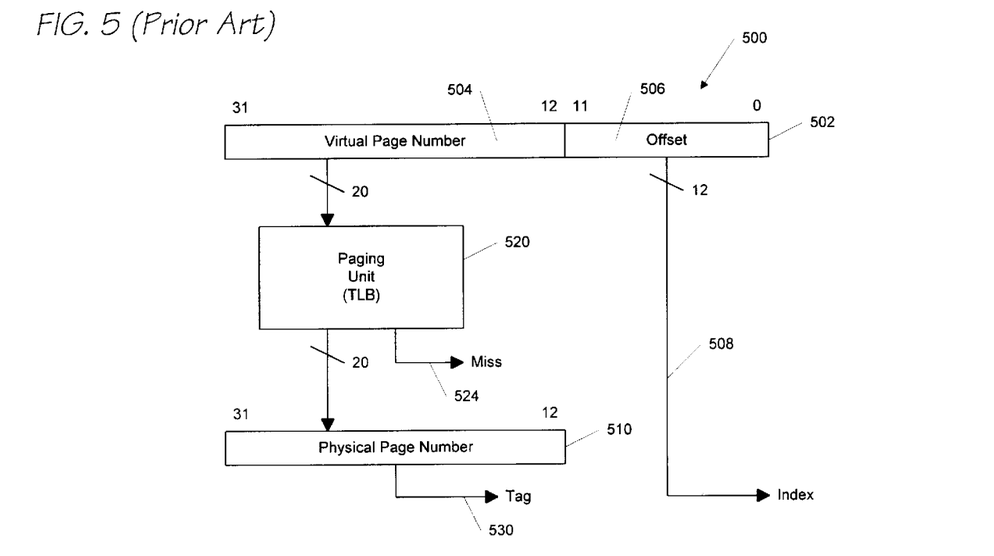
FIG. 5 is a block diagram illustrating translation of a virtual address to a physical address.

Now referring to FIG. 5, a block diagram 500 is shown which illustrates how a virtual address is translated into a physical address. One skilled in the art understands that a processing system typically views memory as virtual rather than physical. The overall memory system appears to the processing system as a very large memory, whose size is governed by the total number of addressable locations. For 32-bit addresses, this would be 4 gigabytes. However, few if any systems are completely populated with 4 GB of physical memory. Rather a subset of the virtual address space is stored in physical or real memory, and is addressed by a physical address. The CPU accesses memory by producing a virtual address which is then translated into a physical address. The operating system, or memory management system, manages which virtual addresses are stored at a given point in time within the physical memory.

The block diagram 500 illustrates a 32-bit virtual address 502 which contains a virtual page number (vpn) 504 formed from the upper 20-bits, and an offset 506 formed from the lower 12-bits. The virtual address 502 may be generated by a processing system as is shown in FIG. 3. A paging unit (or translation look-aside buffer) 520 is then used to read the 20-bit vpn 504, and to look up, or translate the vpn 504 into a physical page number (ppn) 510 which may then be used to address main memory (not shown), or to be used to compare to a TAG on bus line 530. The offset 506 is sent, via a bus line 508 directly to main memory, and/or to a cache memory system. If the paging unit 520 is unable to find a ppn 510 for a particular vpn 504, a miss signal 524 is generated.

Figure 6:
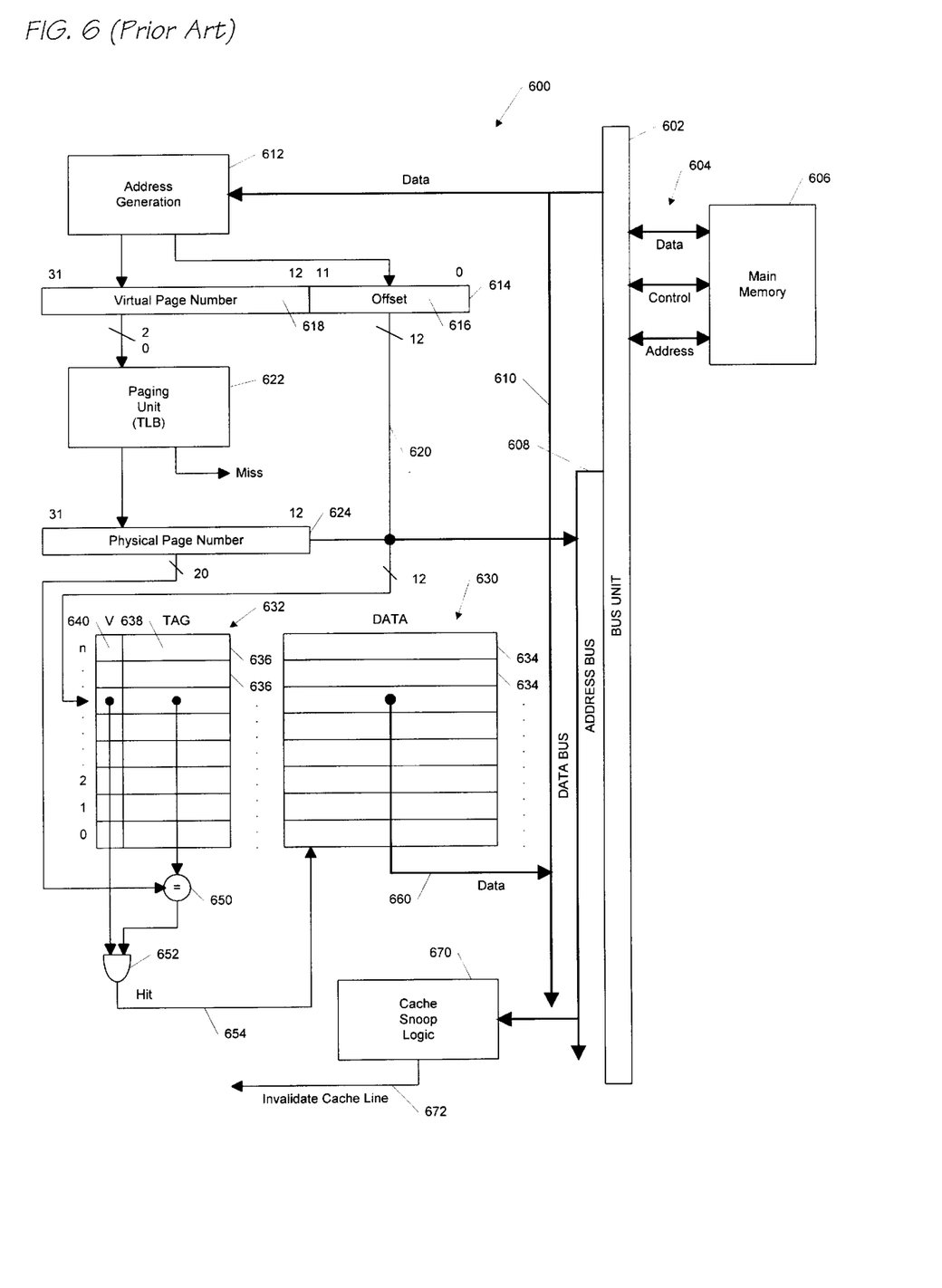
FIG. 6 is a block diagram of a computer system illustrating a cache memory system referenced by physical addresses.

Now referring to FIG. 6, the block diagrams of FIGS. 4 & 5 are placed together to illustrate how a processing system 600 addresses a cache memory. The processing system 600 includes a bus unit 602 which is connected to a main memory 606 via a system bus 604. The system bus 604 includes a data bus 608, and address bus 610 and a control bus. Address generation logic 612 produces a virtual address 614, which in this example is 32-bits wide. The virtual address 614 includes an offset portion 616 and a virtual page number 618. The offset 616 is provided directly to the address bus 608 via offset bus 620. The offset 616 is also provided directly to a cache tag array 632 as will be further described below. The virtual page number 618 is provided to a paging unit 622 for translation into a physical page number 624. The ppn 624 is provided to the address bus 608 in parallel with the offset 616.

As discussed with reference to FIG. 4, the cache memory includes a data array 630, and a tag array 632. The data array 630 includes a plurality of cache lines 634 which cumulatively store a page of data. Associated with each cache line 634 are tag lines 636 within the tag array 632. Each of the tag lines 636 include a tag portion 638 and a valid bit 640. When a virtual address 614 is translated into a physical address, the offset 616 indexes a particular tag line 636 corresponding to the set in main memory where the desired data is stored. The indexed tag 636, corresponding to the page number of data stored in the associated cache line 634 is provided to a comparator 650. Also provided to the comparator 650 is the ppn 624. By providing the ppn 624, and the indexed tag 636 as inputs to the comparator 650, a determination is made whether the associated cache line contains the desired data. If it does, the comparator provides a positive indication to an and gate 652 which also has the valid bit 640 of the indexed tag line 636 as an input. If both the valid bit 640 and the comparator 650 output are positive, a hit on hit line 654 is provided to the data array 630, and data in the associated cache line is provided to the processing system via the data bus 610.

The above operation is well known to one skilled in the art. However, what has not yet been discussed is the purpose of the valid bit 640. In most systems, it is possible for the contents of the main memory 606 to be changed by logic, or I/O devices external to the bus unit 602. For example, multiple processing systems may reside within the same computer, and may share all, or a portion of the main memory. In addition, data may be transferred to main memory directly from external media such as a hard disk, or from serial or parallel ports in the computer. If the data is transferred to a location in the main memory 606 which is also stored in the data array 630, then the data in the data array 630 is no longer accurate, or valid. One mechanism which is used to insure that data within the data array 630 is valid is cache snoop logic 670. Cache snoop logic 670 monitors the address bus 610 to determine whether any of the memory addresses which appear on the bus relate to data which is also stored within the data array 630. A more complete description of the cache snoop logic 670 is now provided with reference to FIG. 7.

Figure 7:
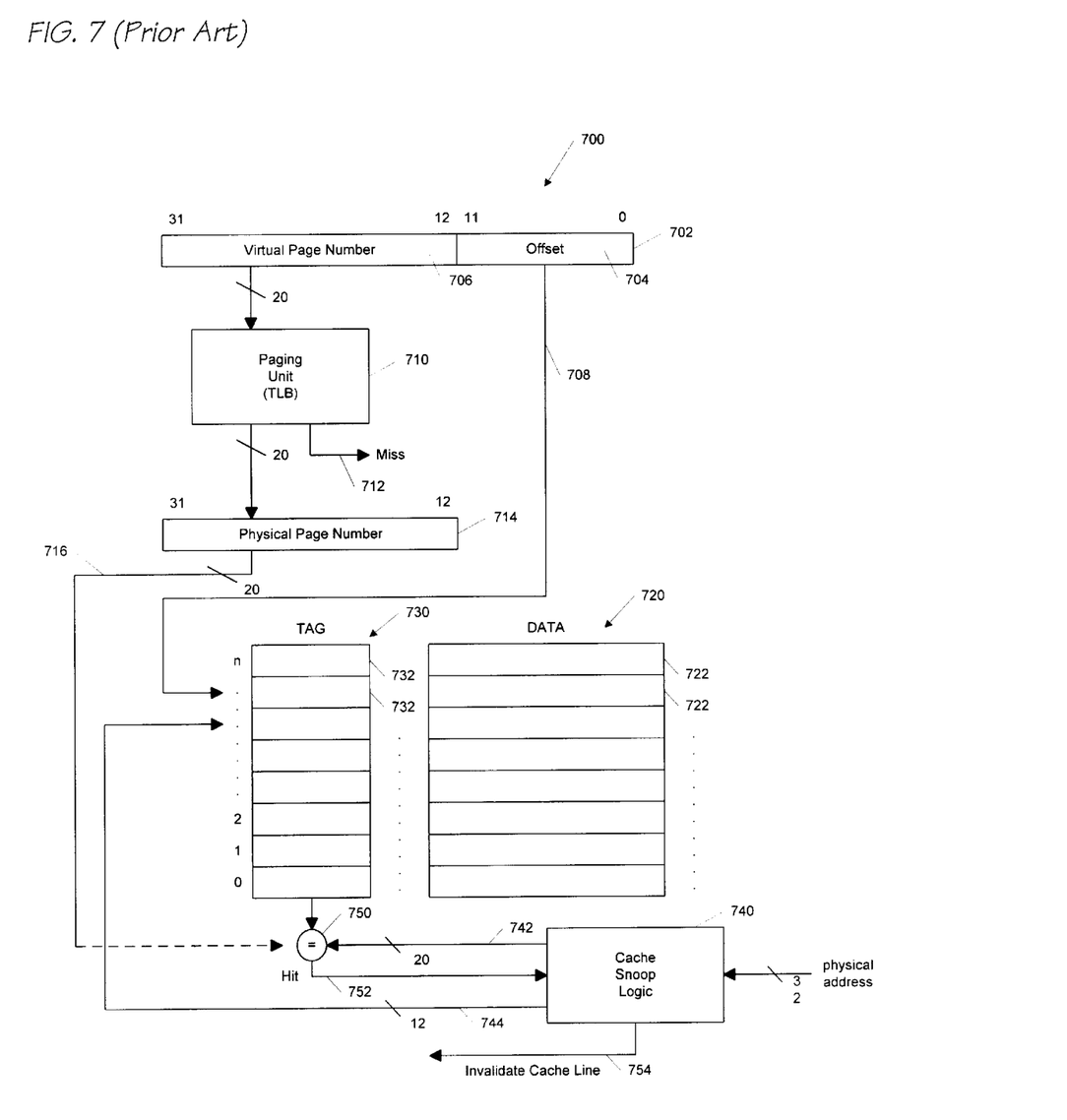
FIG. 7 is a block diagram illustrating cache snoop logic indexing into a tag array.

In FIG. 7, a block diagram 700 is provided which shows a cache snoop logic 740 indexing into a tag array 730. More specifically, a virtual address 702 is shown which contains an offset portion 704, and a vpn 706. The offset portion 704 is provided via a bus 708 to index into a tag array 730. The vpn 706 is provided to a paging unit 710 which translates the vpn 706 into a ppn 714, as discussed above. The ppn 714 is then provided as an input to a comparator 750 via a bus line 716. As above, the tag array 730 contains a plurality of tag lines 732, associated with a plurality of cache lines 722 within the data array 720.

The cache snoop logic 740 is attached to an address bus (not shown) and monitors all addresses appearing on the address bus. The addresses which appear on the address bus are physical, rather than virtual. The cache snoop logic 740 separates the physical address into an index which appears on an index bus 744, and a ppn which appears on ppn bus 742. The index bus 744 provides the index to the tag array 732 to retrieve the indexed tag. In this instance, the tag array 732 stores the physical page address of the data indexed by the tag. This is known as a physically indexed tag array. The indexed tag is compared to the ppn on the ppn bus 742, and if it is the same, a hit is generated by the comparator 750 on hit line 752. If the cache snoop logic 740 receives a hit on hit line 752, an invalidate cache line 754 signal is generated which resets the valid bit within the indexed tag line 732. By using the cache snoop logic 740 to monitor physical addresses on the address bus, and by comparing the physical addresses with the tags in the tag array 730, the validity of data stored in associated cache lines is insured.

So far, a general description has been provided for virtual/ physical addresses, cache memory, indexing into tag arrays, and cache snooping. From the above it should be clear to one skilled in the art that for the cache snoop logic 740 to be able to index into the same tag array 730 that is also indexed into by the virtual address 702, the lower bits, 0 . . . 11 for example, of both the virtual address 702, and the physical address must be the same. Heretofore, this mandated that the tag array 730, and the associated data array 720 be organized according to the page size of physical memory. But, as was mentioned above, limiting the data array to the size of a physical page requires duplication of data arrays, and therefore duplication of hardware associated with each data array. A better description of the duplicated hardware is now provided with reference to FIG. 8.

Figure 8:
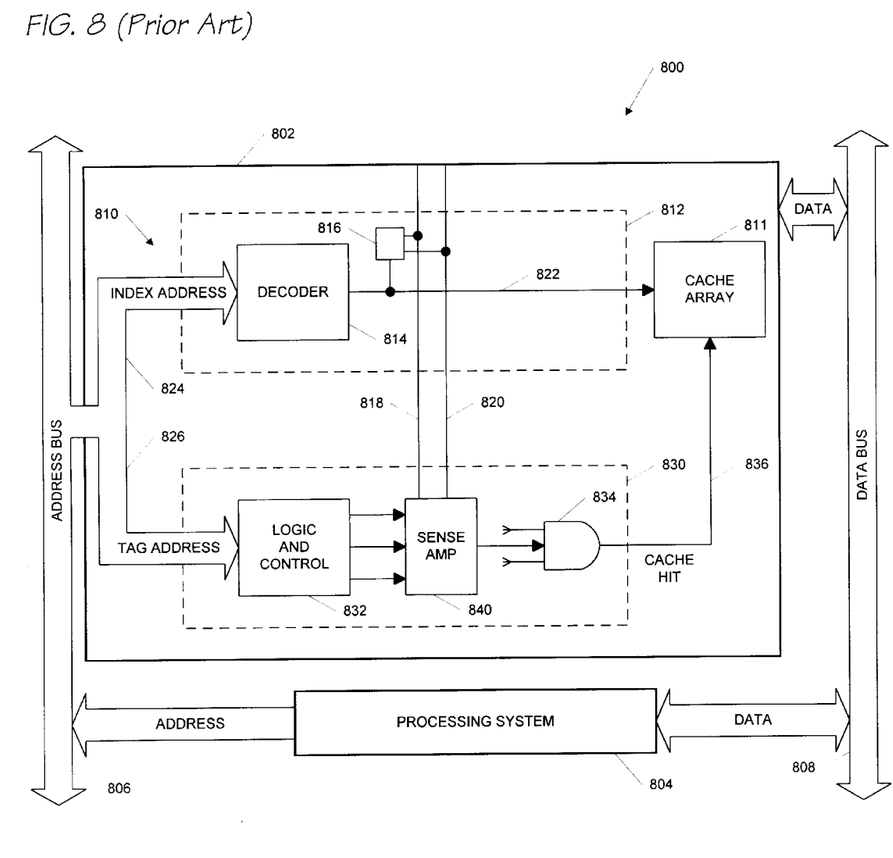
FIG. 8 is a block diagram of a processing system having a sense amplifier on a cache tag array.

In FIG. 8, a computer system 800 is shown which includes a processing system 804 which communicates with a cache system 802 via an address bus 806 and a data bus 808. The cache system 802 includes a tag array 810 and a cache array 811. The tag array 810 includes a tag portion 812 and a sense amplifier portion 830. The tag portion 812 includes a decoder 814, a bit cell 816, a first bit line 818, a second bit line 820, and a row line 822. The sense amplifier portion 830 includes a logic and control block 832, a sense amplifier 840, and an and gate 834.

The processing system 804, during program execution, transmits data over the data bus 808, and addresses over the address bus 806. The address is separated by the cache system 802 into an index address 824, for indexing into the tag array, and a tag address 826, for comparing with the page tag (not shown) at the indexed address. The decoder 814 decodes the index address and asserts one row line corresponding to the index (e.g., the set where data is stored). Row line 822, coupled to the decoder 814, represents one of a plurality of row lines corresponding to all possible values for the index address. Located at intersections of each one of the row lines 822 and a plurality of bit line pairs are memory cells such as bit cell 816 which is shown coupled to bit lines 818 and 820. The bit lines 818 and 820 provide signals to the sense amp 840, as further described below.

The number of entries in the tag portion 812 located on a row line 822 is determined by the cache organization. For example, a tag array with 128 sets or rows, and a 20-bit tag, may have 20 bit cells 816 on each row line 822. And, 128 row lines may exist, corresponding to the 128 sets. When the decoder 814 decodes an index address and asserts an appropriate row line 822, the entries in the corresponding bit cells 816 are read out onto the bit line pairs 818, 820. The sense amp 840 compares the value stored in the selected bit cells 816, on the row line selected by the index address, to the tag address. If a match is found, a signal is asserted for that bit position. If all bit positions match corresponding bits in the input address, then a cache hit signal is sent on bus 836. The cache hit signal informs the cache array 811 that the address asserted on the address bus 806 corresponds to a valid entry in the cache. In response to the hit, the cache array 811 provides data in a cache line associated with the indexed line onto the data bus 808.

Within the cache array 811, similar bit cells, row lines, and sense amps are provided which parallel the organization of the tag array 810. Thus, in a 4 kb cache array, as described above, a decoder, 128 row lines, 128×256 bit cells, and bit line pairs, and 256 sense amps are required. If an 8 k cache were desired, it would be necessary to form a two-way set associative cache where each cache array was 4 kb in size. And, for a 16 kb cache, the arrangement shown in FIG. 8 would need to be duplicated four times. Duplication of the logic and control 832, the decoder 814, and the sense amp 840 across each of the arrays is expensive, and requires needed real estate on silicon.

Figure 9:
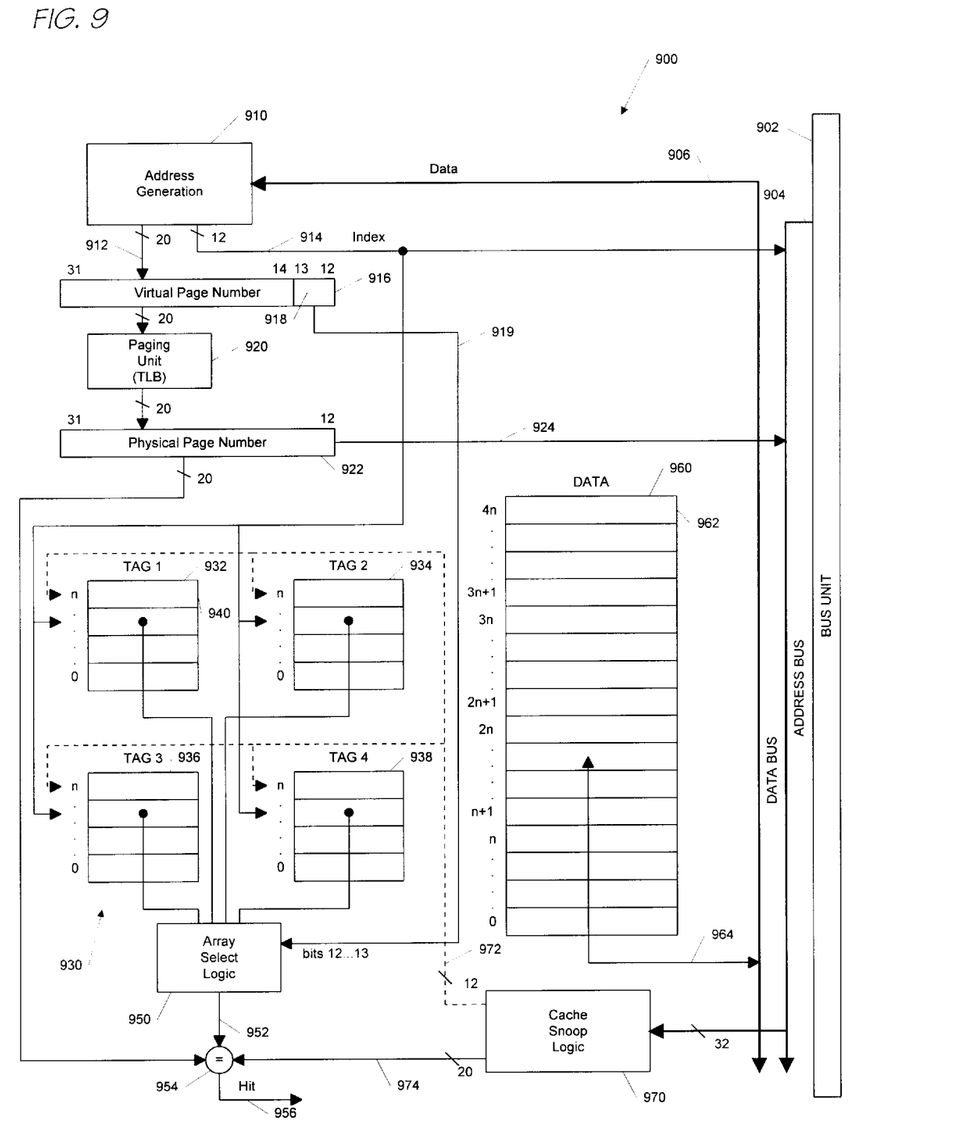
FIG. 9 is a block diagram of a processing system incorporating the present invention which allows indexing into tag arrays by both physical and virtual addresses.

Now referring to FIG. 9, a processing system 900 according to the present invention is shown. The processing system 900 includes a bus unit 902 connected to an address bus 904 and a data bus 906. The processing system also includes address generation logic 910 for generating a virtual address 916. The upper 20 bits of the virtual address, termed the virtual page number or vpn, is provided to a paging unit 920 for translation into a physical page number or ppn 922. The lower 12 bits of the virtual address, termed the index 918 is provided to the address bus, via index bus 914, and to a plurality of tag arrays 932, 934, 936, and 938.

In one embodiment, the tag arrays 932–938 provide tag lines 940 for a single 16 kb data array 960, rather than for four separate data arrays. The typical four separate data arrays have been organized as a single 16 kb data array 960, thereby eliminating three-fourths of the sense amps and control logic associated with four separate data arrays. However, as discussed earlier, since the data array 960 is no longer organized to conform to the physical page size in memory, in this example 4 kilobytes, the lower 12 bits of the virtual and physical addresses are not sufficient to select a particular set within the tag arrays 930. And, since none of the upper 20-bits of the virtual address are guaranteed to remain the same after translation into the ppn, designating upper bits of the virtual address to help select an appropriate set within the tag array 930 is also inadequate.

To overcome the above difficulties, and to allow the benefits of the combined data array 960, each of the tag arrays 932–938 are connected to an array select logic 950. Also connected to the array select logic 950 are the lower 2 bits 918 of the virtual page number 916. The index is transmitted via the index bus 914, to each of the tag arrays 932–938, to retrieve the tags associated with the indexed tag line. Each of the four tags are provided as inputs to the array select logic 950. In addition, the lower 2 bits 918 of the virtual page number 916 are used to select which of the four tags should be used to compare against the ppn 922. The selected tag is output via bus 952 to a comparator 954, also connected to the ppn 922. If a match occurs, the comparator 954 indicates a match by sending a hit signal on bus 956. As one skilled in the art will appreciate, the hit signal 956 is used to inform the data array 960 to release the data stored in the associated cache line.

Also shown in FIG. 9 is cache snoop logic 970. As before, the cache snoop logic is connected to the address bus 904 to monitor address bus activity, and to insure that the contents of the data array 960 contain valid data. The address from the address bus is separated by the cache snoop logic 970 into an index portion, on bus 972, and a ppn portion on bus 974. Thus, when the cache snoop logic receives an address, the index portion 972 indexes each of the tag arrays 932–938 to select the appropriate tag. Tags from each of the tag arrays 932–938 are provided to the array select logic 950. The selected tag is compared against the ppn portion 974, and if a match from any of the tag arrays 932–938 is found, the cache snoop logic 970 is informed. The cache snoop logic 970 can then invalidate the appropriate cache line 962 in the data array 960 by flipping the valid bit (not shown) in the selected indexed tag line 940.

Figure 10:
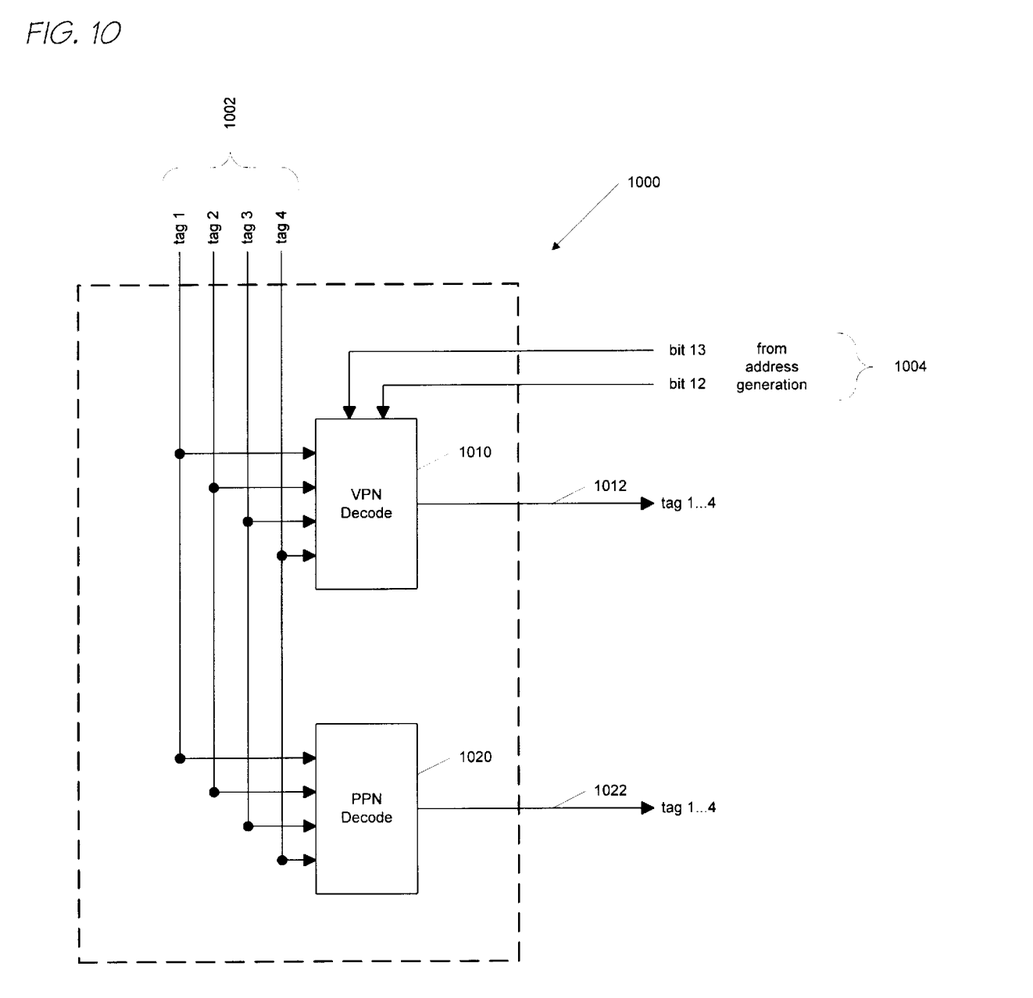
FIG. 10 is a schematic diagram illustrating the array select logic of FIG. 9.

Now referring to FIG. 10, a schematic diagram of the array select logic 1000 is shown. The array select logic 1000 contains vpn decode 1010 and ppn decode 1020. Both the vpn decode 1010 and the ppn decode 1020 are connected to tag buses 1002 for receiving tags from external tag arrays (as shown in FIG. 9). The vpn decode 1010 is also connected to address generation bits 1004. These bits 1004 are used by the vpn decode 1010 to select one of the four tags 1002 to be output on tag bus 1012. By utilizing the array select logic 1000 to select for output one of a plurality of tag inputs 1002, and by selecting an appropriate output tag using a portion of both the ppn and the vpn, a data array may be manufactured to store more data than a physical page in memory.

Although the present invention has been described in considerable detail with reference to certain preferred versions thereof, other versions are possible. For example, the organization of the data array shown in FIG. 9 was representatively only. Other sizes of cache could be created, and other page sizes accommodated. An important aspect is that the common address lines of the physical address and virtual address are used to index into the plurality of tag arrays, and a particular array from the plurality is selected by logic which is aware of both the physical page number and the virtual page number. The use of the lower bits of the vpn and ppn is exemplary only. For example, if a 32 kb data array required 8 tag arrays, 4 bits might be necessary to select the appropriate tag array to output to the comparator. In addition, the location of the array select logic may be incorporated into the tag arrays, into the comparator, or other portions of the cache control circuitry. It should also be understood that various changes, substitutions and alterations can be made herein without departing from the spirit and scope of the invention as defined by the appended claims.

We claim:

1. A cache memory within a processing system that allows a data array to store more data than is stored in a physical page in a main memory, the cache memory system comprising:

a data array, said data array having a plurality of cache lines for storing data;

a plurality of tag arrays, each of said tag arrays having a plurality of tag lines, each of said plurality of tag lines associated with one of said plurality of cache lines; wherein each of said tag lines comprise:

a tag, for storing a physical page number corresponding to said data which is stored in said associated cache line; and array select logic, connected to said plurality of tag arrays, for selecting which of said plurality of tag arrays contains a desired tag, whether said cache memory system is addressed with a physical address or a virtual address.

2. The cache memory system as recited in claim 1 wherein said cache memory stores a subset of data that is also stored in the main memory.

3. The cache memory system as recited in claim 1 wherein said processing system is a microprocessor.

4. The cache memory system as recited in claim 1 wherein said data array is a cache memory.

5. The cache memory system as recited in claim 1 wherein each of said plurality of cache lines has a corresponding one of said plurality of tag lines.

6. The cache memory system as recited in claim 1 wherein each of said plurality of cache lines further comprises a plurality of sub cache line locations for storing said data.

7. The cache memory system as recited in claim 6 wherein each of said sub cache line locations stores a quantity of said data equal to the width of a data bus in said processing system.

8. The cache memory system as recited in claim 1 wherein said plurality of cache lines has a cache line for each of said plurality of tag lines in each of said plurality of tag arrays.

9. The cache memory system as recited in claim 1 wherein each of said plurality of tag arrays contains a number of said plurality of tag lines corresponding to an integer divisible number of said plurality of cache lines.

10. The cache memory system as recited in claim 1 wherein each of said plurality of tag arrays contains said tag lines associated with a physical page worth of said data stored in said plurality of cache lines.

11. The cache memory system as recited in claim 1 wherein said virtual address is translated into said physical address, and wherein said physical address further comprises:

a physical page number defined by certain high order bits in said physical address; and a first index, defined by certain low order bits in said physical address;

wherein said physical page number provides a base address for a physical page in the main memory, and said first index provides an offset from said base address within said physical page; and wherein said virtual address further comprises:
a virtual page number defined by certain high order bits in said virtual address; and
a second index, defined by certain low order bits in said virtual address;
wherein said virtual page number provides a base address for a virtual page, to be translated into a corresponding physical page in the main memory, and said first index and said second index are the same for each said virtual address translated into said physical address.

12. The cache memory system as recited in claim 11 wherein said virtual page number is translated into said physical page number by a paging unit.

13. The cache memory system as recited in claim 11 wherein both of said first index and said second index may be used to address one of said plurality of tag lines within at least one of said plurality of tag arrays.

14. The cache memory system as recited in claim 13 wherein said first index or said second index may be used to address one of said plurality of tag lines within more than one of said plurality of tag arrays.

15. The cache memory system as recited in claim 11 wherein certain low order bits of said virtual page number may be used to select a particular one of said plurality of tag arrays.

16. The cache memory system as recited in claim 15 wherein each of said plurality of tag arrays are addressed by said physical address.

17. The cache memory system as recited in claim 16 wherein for said virtual address, said second index is used to address one of said plurality of tag lines within at least one of said plurality of tag arrays, and said certain low order bits of said virtual page number is used to select said particular one of said plurality of tag arrays.

18. The cache memory system as recited in claim 17 wherein for said physical address, said first index is used to address one of said plurality of tag lines within at least one of said plurality of tag arrays.

19. The cache memory system as recited in claim 1 wherein each of said tag lines further comprise a valid bit for indicating whether said data stored in said associated cache line is valid.

20. The cache memory system as recited in claim 1 wherein said cache memory system further comprises cache snoop logic, for snooping said physical address on an address bus, and for using said snooped physical address to determine whether data stored at said physical address in the main memory is also stored in said data array.

21. An addressing system for a cache memory, the addressing system allowing a tag array to be addressed by either a physical address on a physical address bus or a virtual address on a virtual address bus, the addressing system comprising:
a data array, said data array having a plurality of cache lines for storing data;
a plurality of tag arrays connected to said data array, each of said tag arrays having a plurality of tag lines, said tag lines corresponding to said plurality of cache lines, each of said tag arrays addressing the equivalent of a physical page of said stored data;
an index address portion, within each of said virtual address and said physical address, which has the same value for both of said virtual address and said physical address, said index address portion being used to select a particular one of said plurality of tag lines within each of said plurality of tag arrays;
a page address portion, within both of said virtual address and said physical address, said page address portion representing the same bit locations with both of said virtual address and said physical address, but having different values for said virtual address and said physical address; and
array select logic, connected to said plurality of tag arrays, and to both of said virtual address bus and said physical address bus, for reading said page address portion, from either of said virtual address bus or said physical address bus, and for selecting a particular tag array from said plurality of tag arrays;
whereby said index address portion indexes a desired tag line within each of said plurality of tag arrays, and wherein said array select logic uses said page address portion to select a particular one of said desired tag lines from one of said plurality of tag arrays.

22. The addressing system for a cache memory as recited in claim 21 wherein said cache lines further comprise a plurality of sub cache line locations for storing said data.

23. The addressing system for a cache memory as recited in claim 22 wherein each of said sub cache line locations stores a quantity of said data equivalent to the width of a data bus to which said data array is connected.

24. The addressing system for a cache memory as recited in claim 21 wherein said cache lines further comprise a plurality of storage bits, each for storing a single bit of digital data.

25. The addressing system for a cache memory as recited in claim 24 wherein said data array further comprises row select logic for selecting particular ones of said plurality of cache lines, and column bit line drivers, for selecting ones of said plurality of storage bits.

26. The addressing system for a cache memory as recited in claim 24 wherein said row select logic and said column bit line drivers can address all of said plurality of storage bits within said data array.

27. The addressing system for a cache memory as recited in claim 21 wherein said physical page stores four kilobytes worth of said data.

28. The addressing system for a cache memory as recited in claim 27 wherein said data array stores sixteen kilobytes worth of said data.

29. The addressing system for a cache memory as recited in claim 27 wherein said data array stores four times as much data as found in said physical page.

30. The addressing system for a cache memory as recited in claim 21 wherein each of said tag lines stores a physical page number corresponding to a physical page in main memory where data is stored.

31. The addressing system for a cache memory as recited in claim 30 wherein said physical page number stored in each of said tag lines also refers to data stored in a corresponding cache line in said data array.

32. The addressing system for a cache memory as recited in claim 31 wherein said corresponding cache line may also be referenced by said virtual address utilizing said array select logic.

33. The addressing system for a cache memory as recited in claim 21 wherein said index address portion comprises bits 0 through 11 of both of said physical address and said virtual address.

34. The addressing system for a cache memory as recited in claim 21 wherein said page address portions comprises bits 12 and 13 of said physical address and said virtual address.

35. The addressing system for a cache memory as recited in claim 21 wherein each of said tag lines stores a physical page number comprising bits 12 through 31 of said physical address.

36. A method for accessing a data array within a cache memory which allows the data array to be larger than a physical page in a main memory, the data array including a plurality of cache lines, and the cache memory including a plurality of tag arrays, each of the tag arrays having tag lines corresponding to the cache lines, the method comprising the steps of:

providing a physical page in a main memory of size N;

providing a data array in a cache memory of size M*N, where M is an integer having a value greater than 1;

providing M tag arrays having a plurality of tag lines, each of said tag arrays corresponding to a sub portion of size N of said data array;

using index bits within both a physical address and a virtual address to address one of said plurality of tag lines within each of said tag arrays;

using page bits within both the physical address and the virtual address, the page bits representing the same bit locations within both the physical address and the virtual address, to address one of said M tag arrays;

whereby the combination of said index bits and said page bits specifies a particular location within the data array.

37. The method for accessing a data array, as recited in claim 36 wherein a physical page is addressed by a physical page number, and wherein the physical page number is located by examining the upper 20 bits of the physical address.

38. The method for accessing a data array, as recited in claim 37 wherein data locations within a physical page are addressed by an index, and wherein the index is located by examining the lower 12 bits of either the physical address or the virtual address.

39. The method for accessing a data array, as recited in claim 37 wherein said page bits are the lower bits of the physical page number.

* * * * *